Patented Oct. 1, 1940

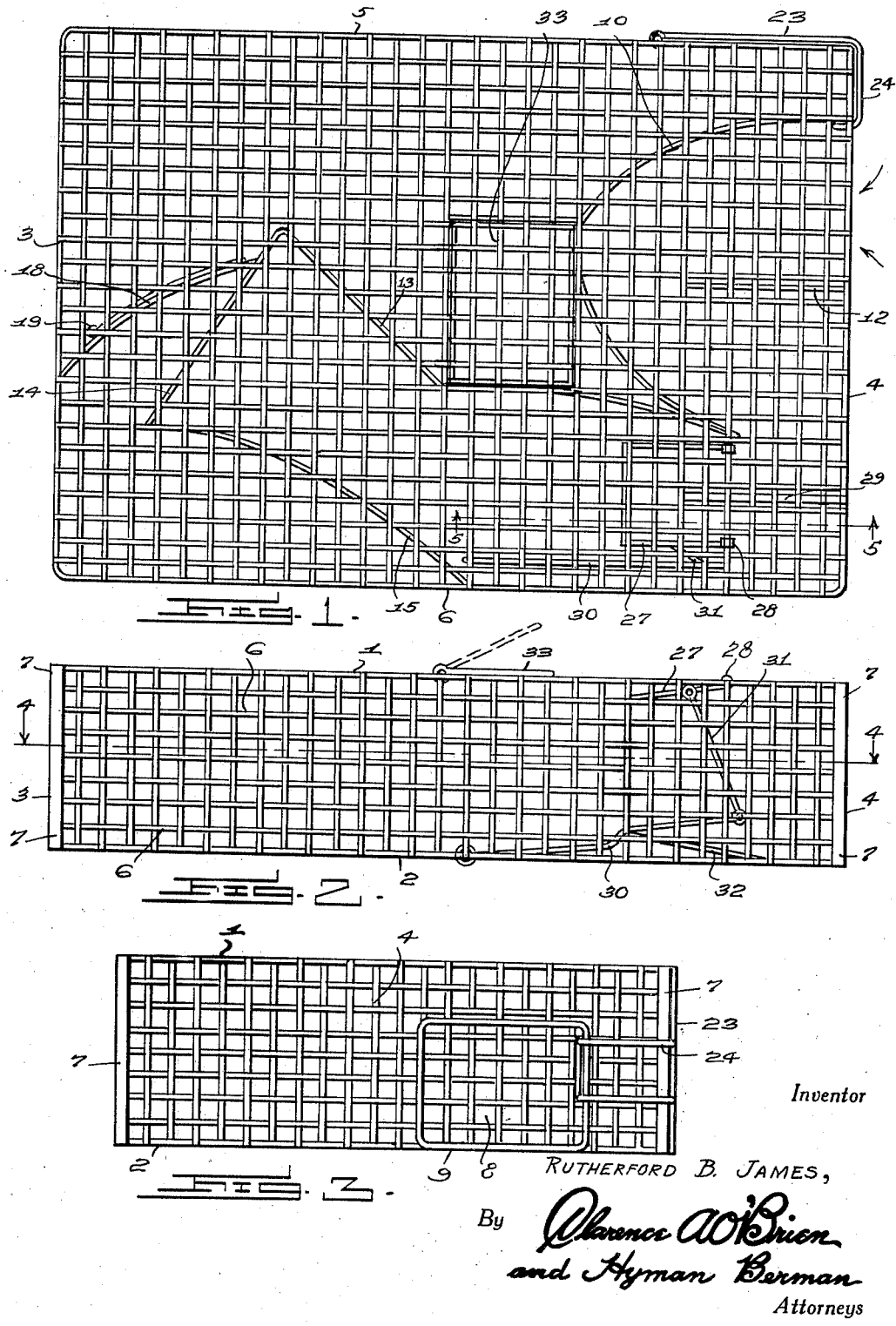

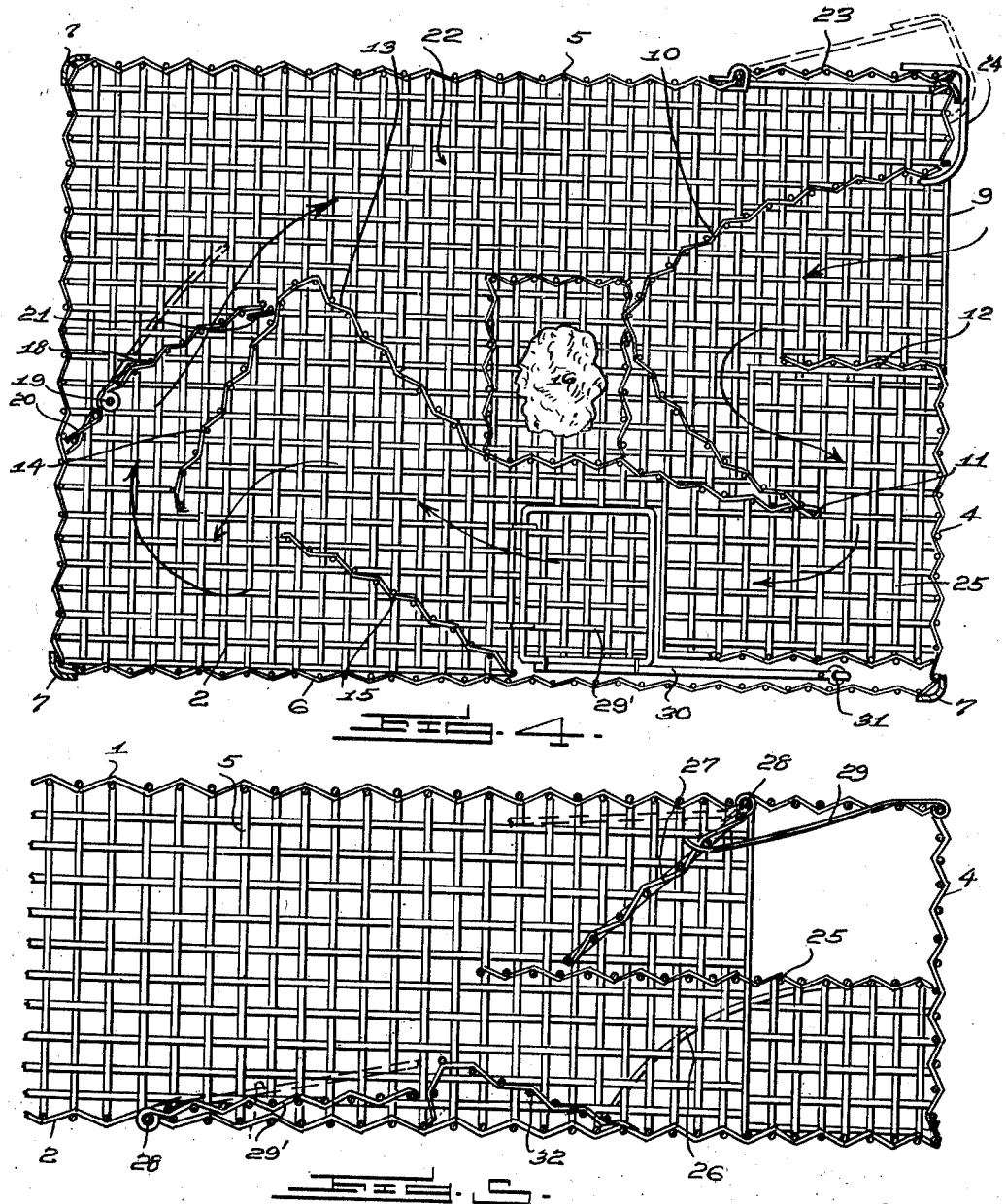

2,216,196

UNITED STATES PATENT OFFICE 2,216,196

RODENT TRAP

Rutherford B. James, Fairbury, Ill., assignor of one-half to Herbert W. Hildebrandt, Normal, Ill.

Application November 8, 1939, Serial No. 303,462

3 Claims. (Cl. 43—67)

My invention relates to improvements in rodent traps for use more particularly in catching rats.

The invention is designed with the particular objects in view of providing a device of this character for catching rats alive and which may be manufactured inexpensively for low priced trade, is constructed to quickly lure the rats therein, and is escape-proof, readily emptied and easily kept clean, and adapted to withstand rough usage.

To the accomplishment of the above, and subordinate objects presently appearing, a preferred embodiment of my invention has been illustrated in the accompanying drawings, set forth in detail in the succeeding description, and defined in the claims appended hereto.

In said drawings:

Figure 1 is a view in top plan of the preferred embodiment of my invention,

Figure 2 is a view in side elevation,

Figure 3 is a view in front elevation,

Figure 4 is a view in longitudinal section taken on the line 4—4 of Figure 2, looking downwardly as indicated by the arrows, and Figure 5 is a fragmentary view in longitudinal vertical section on the line 5—5 of Figure 1 looking in the direction indicated by the arrows.

Referring to the drawings by numerals, in the embodiment illustrated the trap of my invention comprises a rectangular shallow cage of square mesh wire, preferably, and with the exceptions presently noted, and including a top 1, a bottom 2, front and rear ends 3, 4, and right and left sides 5, 6. The corners of the cage may be reinforced by suitable corner bars 7. The front end 4 has formed therein adjacent the right side 5, a low doorway 8 formed by a rectangular wire frame 9 suitably secured in said end. The doorway 8 opens into one side of a vestibule formed by a vertical partition 10 in said cage suitably secured to the top 1 and bottom 2 and being rearwardly bowed with one end suitably attached to the front end 4 on the right-hand side of the frame 9 and its other end 11 terminating in spaced relation to said front end 4 and intermediate the frame 9 and left side 6 of the cage. A short vertical partition 12 in said cage extends rearwardly from the left side of frame 9 into the vestibule for a short distance. From the end 11 of partition 10 a vertical partition 13 is provided in the cage to extend from said end lengthwise of the cage diagonally toward the rear end 3, said partition 13 having an angularly related end forming a short partition 14 extending crosswise of the cage diagonally and spaced from the rear end 3. A third vertical partition 15 is provided in the cage between the left side 6 and the partition 13 extending from said side 6 substantially midway of the ends 3, 4 inwardly and diagonally and substantially parallel with partition 13, said partition 15 terminating in spaced relation to the outer end of the partition 14. In the rear of the partition 10 and to the right of partition 13 is an open-sided compartment for bait 16 formed by a generally U-shaped partition 17 having its ends suitably secured to the partition 13. As will be seen, upon reference to Figures 1 and 4, the partition 14 is spaced from the rear end 3 and said space is bridged by a vertical door 18 forming together with said partition 14 a V-shaped passageway, the door being hinged at one end, as at 19, adjacent the rear end 3 and spring pressed, as indicated at 20, to close its opposite end against a vertical door stop 21 suitably secured to the top 1 and bottom 2 adjacent partition 14.

As will now be seen, the vestibule forming partition 10 and the partition 12 form a curved entrance passageway doubling back upon itself, and the partition 13, left side 6 and partition 15 form in the cage an elongated irregular passageway, or tunnel, with which the curved passageway communicates, the elongated passageway being located at the left side of the cage and opening into the left rear corner of the cage, and the beforementioned V-shaped passageway, the latter having an exit by way of the door 18 into a compartment 22 in the righthand side of the cage into which the latter is divided by the partitions 10, 17, 13, 21 and the door 18. As will also be manifest, the bait compartment guards the bait against access thereto from any passageway or the compartment 22. An outwardly opening door 23 is provided in the righthand side 5 of the cage for letting the trapped animal out of the compartment 22 to be disposed of as desired, said door being suitably hinged, as at 23, and having a suitable catch 24 thereon for interlocking with the mesh of the cage.

A horizontal, raised platform 25 is provided in the front end of the elongated passageway, above described, and includes a part 26 that extends into the vestibule to the partition 12, and curves upwardly and out of said vestibule from the bottom 2. An upwardly and rearwardly opening trap door 27 is provided in the described elongated passageway between the platform 25 and the top 1, said door being hinged, as at 28, to the top 1 and tensioned by a suitably arranged leaf spring 29 to normally swing open.

Immediately in the rear of the platform 25, a treadle 29' is hinged to the bottom 2 in the described elongated passageway, said treadle having suitably fixed to one side thereof a lever 30 operatively connected to the door 27 by a link 31, the arrangement being such that the weight of a rat on the treadle 29' causes the latter to be depressed and the door 27 to be closed. A baffle 32 in the elongated passageway, on the bottom 2, blocks entrance by the rat from the space under the platform 25 to the space under the treadle 29' so as to prevent the rat from tearing up the latter. To this end, and as best shown in Figure 4, the baffle 32 is arranged to incline horizontally rearwardly so as to extend even with the treadle 29' when the latter is in normal elevated position and above the treadle when the latter is depressed.

A suitable door 33 in the top 1 provides for access to the described bait compartment 16.

In the use of the invention, a rat being attracted by the bait 16, seeks access thereto and enters the doorway 8 to follow the described curved passageway in the vestibule formed by the partitions 10, 12, and climbs up onto the platform 25 by means of which it enters the elongated passageway described. In this elongated passageway he progresses under the door 27 and jumps down off the platform 25 onto the treadle 29', thereby closing the door 27 behind him. He then, under the lure of the bait, travels along the elongated passageway out of the same and into the V-shaped passageway formed by the partition 14 and door 18, pushes against said door and enters compartment 22 in which he is trapped by closing of the door 18. Should the rat attempt to back out of the elongated passageway, or retreat therefrom, it encounters the treadle 29' and again closes the door 27, thus blocking escape in that direction.

The door 27 functions in another capacity also in that it acts as a booster when the rat steps down on the treadle 29' striking him in the rear and thereby causing him to dart toward the rear of the elongated passageway. The space under the platform 25 is an important part of the trap, the rat finding himself therein becomes frightened and dashes out of the same to the rear of the elongated passageway and door 18.

As will be clear, the principle of the trap is tortuous, or circuitous passageways around a centrally located inaccessible bait, visible at all times and easily scented to lure the animal along the passageway into a final compartment from which it cannot escape, together with effectively blocking any attempt of the animal to retreat once it is in a secondary passageway.

The foregoing will, it is believed, suffice to impart a clear understanding of my invention without further explanation.

Manifestly the invention, as described, is susceptible of modifications without departing from the inventive concept and the right is herein reserved to such modifications as fall within the scope of the subjoined claims.

What I claim is:

1. A rodent trap comprising a wire mesh cage of shallow rectangular form having a top, bottom and sides, respectively, and front and rear ends, an open-sided bait compartment in the approximate center of the cage, a rearwardly bowed vertical partition in the front end forming together with said end a vestibule having a side exit opening therein, a doorway in said front end adjacent the other side of the vestibule for access to said vestibule, a short vertical partition in said vestibule extending from said front end and terminating short of said bowed partition and forming with the latter a circuitous passageway in said vestibule leading to the exit opening thereof, a series of vertical partitions in said cage between said exit opening and the rear end of the cage forming together with said rear end and one side of the cage a tortuous passageway extending along one side of the cage, said series of partitions and the bowed partition forming in the cage a large compartment on the other side thereof, said tortuous passageway skirting around said bait compartment, and an outwardly opening door leading from said tortuous passageway adjacent the rear end of the cage into said large compartment and being spring pressed into closing position.

2. A rodent trap comprising a wire mesh cage of shallow rectangular form having a top, bottom and sides, respectively, and front and rear ends, an open-sided bait compartment in the approximate center of the cage, a rearwardly bowed vertical partition in the front end forming together with said end a vestibule having a side exit opening therein, a door-way in said front end adjacent the other side of the vestibule for access to said vestibule, a short vertical partition in said vestibule extending from said front end and terminating short of said bowed partition and forming with the latter a circuitous passageway in said vestibule leading to the exit opening thereof, a series of vertical partitions in said cage between said exit opening and the rear end of the cage forming together with said rear end and one side of the cage a tortuous passageway extending along one side of the cage, said series of partitions and the bowed partition forming in the cage a large compartment on the other side thereof, said tortuous passageway skirting around said bait compartment, an outwardly opening door leading from said tortuous passageway adjacent the rear end of the cage into said large compartment and being spring pressed into closing position, and a treadle operated trap door in said tortuous passageway adjacent said exit opening closing under the weight of the rodent on the treadle.

3. A rodent trap comprising a wire mesh cage of shallow rectangular form having a top, bottom and sides, respectively, and front and rear ends, an open-sided bait compartment in the approximate center of the cage, a rearwardly bowed vertical partition in the front end forming together with said end a vestibule having a side exit opening therein, a door-way in said front end adjacent the other side of the vestibule for access to said vestibule, a short vertical partition in said vestibule extending from said front end and terminating short of said bowed partition and forming with the latter a circuitous passageway in said vestibule leading to the exit opening thereof, a series of vertical partitions in said cage between said exit opening and the rear end of the cage forming together with said rear end and one side of the cage a tortuous passageway extending along one side of the cage, said series of partitions and the bowed partition forming in the cage a large compartment on the other side thereof, said tortuous passageway skirting around said bait compartment, an outwardly opening door leading from said tortuous passageway adjacent the rear end of the cage into said large compartment and being spring pressed into closing position, a treadle operated trap door in said tortuous passageway adjacent said exit opening closing under the weight of the rodent on the treadle, and a raised platform extending from said vestibule into said tortuous passageway by way of said exit opening and terminating above said treadle.

RUTHERFORD B. JAMES.